(12) United States Patent
Solodovnikov et al.

(10) Patent No.: US 8,505,069 B1
(45) Date of Patent: Aug. 6, 2013

(54) SYSTEM AND METHOD FOR UPDATING AUTHORIZED SOFTWARE

(71) Applicant: Kaspersky Lab ZAO, Moscow (RU)

(72) Inventors: Andrey Y. Solodovnikov, Moscow (RU); Kirill N. Kruglov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/686,021

(22) Filed: Nov. 27, 2012

(30) Foreign Application Priority Data

Aug. 10, 2012 (RU) .................................. 2012134242

(51) Int. Cl.
*G06F 21/00* (2013.01)
(52) U.S. Cl.
USPC .................. 726/1; 726/22; 709/224; 717/168; 717/174
(58) Field of Classification Search
None
See application file for complete search history.

(56) References Cited

U.S. PATENT DOCUMENTS

| | | | |
|---|---|---|---|
| 6,226,747 B1 * | 5/2001 | Larsson et al. | 726/31 |
| 7,430,689 B1 * | 9/2008 | Adams | 714/39 |
| 7,478,381 B2 | 1/2009 | Roberts et al. | |
| 7,584,467 B2 | 9/2009 | Wickham et al. | |
| 7,694,296 B1 | 4/2010 | Kennedy | |
| 8,024,450 B1 * | 9/2011 | Shiyafetdinov et al. | 709/223 |
| 2004/0237083 A1 | 11/2004 | Alcazar et al. | |
| 2005/0097543 A1 | 5/2005 | Hirayama | |
| 2005/0132357 A1 | 6/2005 | Shell et al. | |
| 2005/0216909 A1 * | 9/2005 | James et al. | 717/174 |
| 2006/0136889 A1 * | 6/2006 | Han et al. | 717/162 |
| 2007/0094654 A1 | 4/2007 | Costea | |
| 2007/0277167 A1 | 11/2007 | Smith et al. | |
| 2009/0144718 A1 | 6/2009 | Boggs et al. | |
| 2011/0126286 A1 * | 5/2011 | Nazarov | 726/24 |
| 2011/0289585 A1 * | 11/2011 | Zaitsev | 726/24 |

FOREIGN PATENT DOCUMENTS

WO 03/100610 A1 12/2003

OTHER PUBLICATIONS

European search report from counterpart European Application Pub. No. EP12196845.

* cited by examiner

*Primary Examiner* — Hadi Armouche
(74) *Attorney, Agent, or Firm* — Arent Fox LLP; Michael Fainberg (57) ABSTRACT

Disclosed are system, method and computer program product for updating software programs on a computer. The system detects an attempt by an update process to execute on the computer and retrieves information about authorized category of software programs to determine whether the detected update process is authorized. When the update process is authorized, the system (i) designates the update process as trusted process, (ii) allows the update process to download on the computer an update object, (iii) and designates the update object as a trusted object. The system then detects an attempt by an installation process to install the update object, and determines from the policy whether the detected installation process is associated to authorized category and related to the trusted update process. When the installation process authorized and related to the trusted update process, the system allows the trusted installation process to install the trusted update object.

15 Claims, 6 Drawing Sheets

SYSTEM AND METHOD FOR UPDATING AUTHORIZED SOFTWARE

CROSS-REFERENCE TO RELATED APPLICATIONS

This application claims benefit of priority under 35 U.S.C. 119(a)-(d) to a Russian Application No. 2012134242 filed on Aug. 10, 2012, which is incorporated by reference herein.

TECHNICAL FIELD

The present disclosure generally relates to the field of computer security, and specifically to systems, methods and computer program products for updating software.

BACKGROUND

It is impossible to imagine a modern office, regardless of its size, without a computer network. The networks allow quick and secure exchange of information between corporate computers, laptops, smart phones, tablets, printers, scanners and other networked electronic devices, which may be located in one building or in multiple offices located in distant geographic areas. Therefore, corporate information technology (IT) infrastructure can become quite complex and require constant administration and support in order to maintain its operation and solve various problems. For example, corporate computer networks are susceptible to attacks by malicious software, such as viruses, worms, Trojans and other types of malware. Malware typically exploits vulnerabilities in programs and applications running on the computers to penetrate corporate security infrastructure. Often malware may hide in software updates and infect a series of computers during large update processes. A malware that infects one corporate computer can then quickly spread through the network and infect other computers. These incidents adversely affect operation of the company because of the need to identify the infected computers and repair damage caused by the malware, as well as the loss of man-hours spent on fixing effected computers. Also, these incidents may lead to the leak or loss of confidential information, trade secrets, proprietary data and even theft of money. That is why control over the corporate networks, such as intranets, is very important, particularly, when it comes to execution and update of various applications deployed thereon.

The control over execution and update of programs and applications on corporate networks is typically performed by software security systems. These systems use different methods for controlling execution and update of software. For instance, some security systems allow execution of all software, which is not explicitly prohibited. In this case, an administrator may a list of specify prohibited applications, so that all other applications are allowed to execute or update on the computers. Other security systems prohibit execution of all software, which is not explicitly allowed. In this case, an administrator may specify a list of allowed applications, so that all other applications are prohibited to execute or update. As far as safety and effectiveness of administration are concerned, the security systems that use the method of denying the execution and update of all prohibited applications are considered to be more effective. These types of systems are sometimes called "Default Deny" systems.

In operation, "Default Deny" security systems of application control often maintain lists of authorized objects (e.g., a list of allowed applications or programs for one or more computers in the network). The system would allow execution an application that is on the list of authorized objects, and block all other applications and programs. These lists can be created based on particular information about the applications and programs, such as unique object identifiers, digital signatures, manufacturer's data, or other types of information. In addition, different lists of authorized objects may be maintained for different users. For example, a list of authorized applications for a graphics designer may include graphic design software; while a list of authorized applications for an accountant will include accounting software. In this manner, "Default Deny" security systems maintain separate lists of authorized software for different users, thereby preventing access to unauthorized software to unauthorized users.

Generally, "Default Deny" security systems are effective in protecting corporate computers from malware. However, these types of security systems have a risk of incorrectly prohibiting execution of authorized software during software update, or even completely blocking some software updates. This can occur when, during software update, additional files are created or loaded to the computer by the updated software, which are not identified in the list of authorized objects, or when existing files are modified. Although these newly created, loaded and/or modified files are associated with authorized applications and, therefore, should be allowed to execute on the computer, the "Default Deny" security systems will typically block these files because they do not appear in the list of authorized objects, which results in a false positive detection of malware. Accordingly, there is a need for a security system for controlling and managing deployment and updates of software on corporate computers that minimizes spread of malware and at the same time prevents false positive detection of malware.

SUMMARY

Disclosed are system, method and computer program product for updating software programs on a computer. In one example embodiment, the security system detects an attempt by an update process to execute on the computer. The system retrieves a policy containing at least an authorized category of software programs for the computer. The software programs from the authorized category of software programs are allowed to execute on the computer. The system determines from the policy whether the detected update process is associated with the authorized category of software programs. When the update process is associated with the authorized category of software programs, the system (i) designates the update process as trusted process, (ii) allows the trusted update process to download on the computer an update object for a software program, (iii) and designates the update object of the software program as a trusted object.

The trusted update process may then download the trusted update object on the computer. The trusted update object contains a software program update. The system then detects an attempt by an installation process to execute on the computer. During execution, the installation process installs the trusted update object. The system determines from the policy whether the detected installation process is related to the trusted update process and associated with the authorized category of software programs. When the installation process is related to the trusted update process and associated with the authorized category of software programs, the system designates the installation process as trusted and allows the trusted installation process to install the trusted update object on the computer.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

In the drawings.

DETAILED DESCRIPTION OF EXAMPLE EMBODIMENTS

Example embodiments, implementations and aspects of the invention are described herein in the context of systems, methods and computer program products for updating authorized software programs on computers in a corporate or home network. Those of ordinary skill in the art will realize that the following description is illustrative only and is not intended to be in any way limiting. Other embodiments and implementations will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
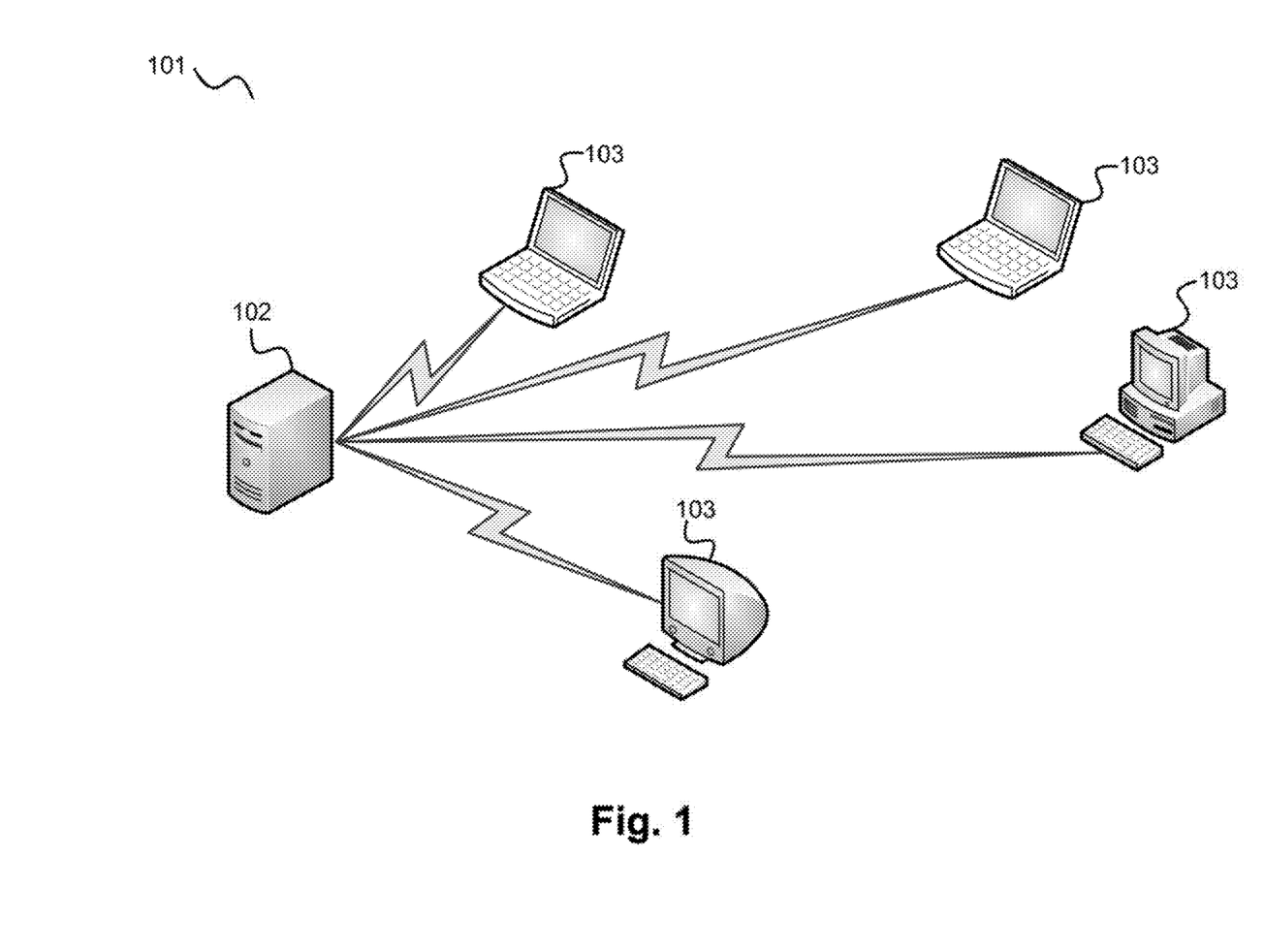
FIG. 1 illustrates an example embodiment of corporate computer network.

FIG. 1 shows an example computer network (corporate or home office) controlled by an administrative server. The network 101, which can be a corporate Intranet comprising one or more wired or wireless local area networks, can contain many different networked electronic communication devices, such as desktop computers, notebooks, tablets, smart phones, printers, etc., which are commonly referred herein as computers 103. An administrative server 102 connected to the network 101 performs various administrative tasks on computers 103. The administrative server 102 may be local to the network 101. Alternatively, the administrative server 102 may be remote from the network 101. In one implementation, the administrative server 102 may deploy local administrative agents on the individual computers 103 to perform various remote administration tasks of the computers 103 in network 101.

In various implementations, the administrative server 102 may perform different administrative tasks either directly or through its administrative agents deployed on the computers 103. These administrative tasks may include, but not limited to, updating antivirus databases and applications on computers 103, installing and updating software, searching for security vulnerabilities on computers 103, administering security policies and group tasks, performing software and hardware inventory of computers 103, saving collected information on the administrative server 102, and other type of remote administrative tasks.

In one implementation, the remote administrative server 102 may communicate with computers 103 via the Internet, and, due to the unreliable nature of this network, may lose connection with one or more computers 103. In this case, the administrative server 102 can designated any computer 103 in network 101, with an administration agent deployed thereon and with which connection is maintained, to function as a temporary proxy of the server 102 for purpose of communicating with the computer(s) 103 with which connection has been temporary lost at least until the connection between the server 102 and that computer is reestablished. Therefore, an administrative agent of the designated proxy computer 103 will temporarily receive administrative task requests from the server 102 and forward them to the designated computers 103 in the network 101.

Figure 2:
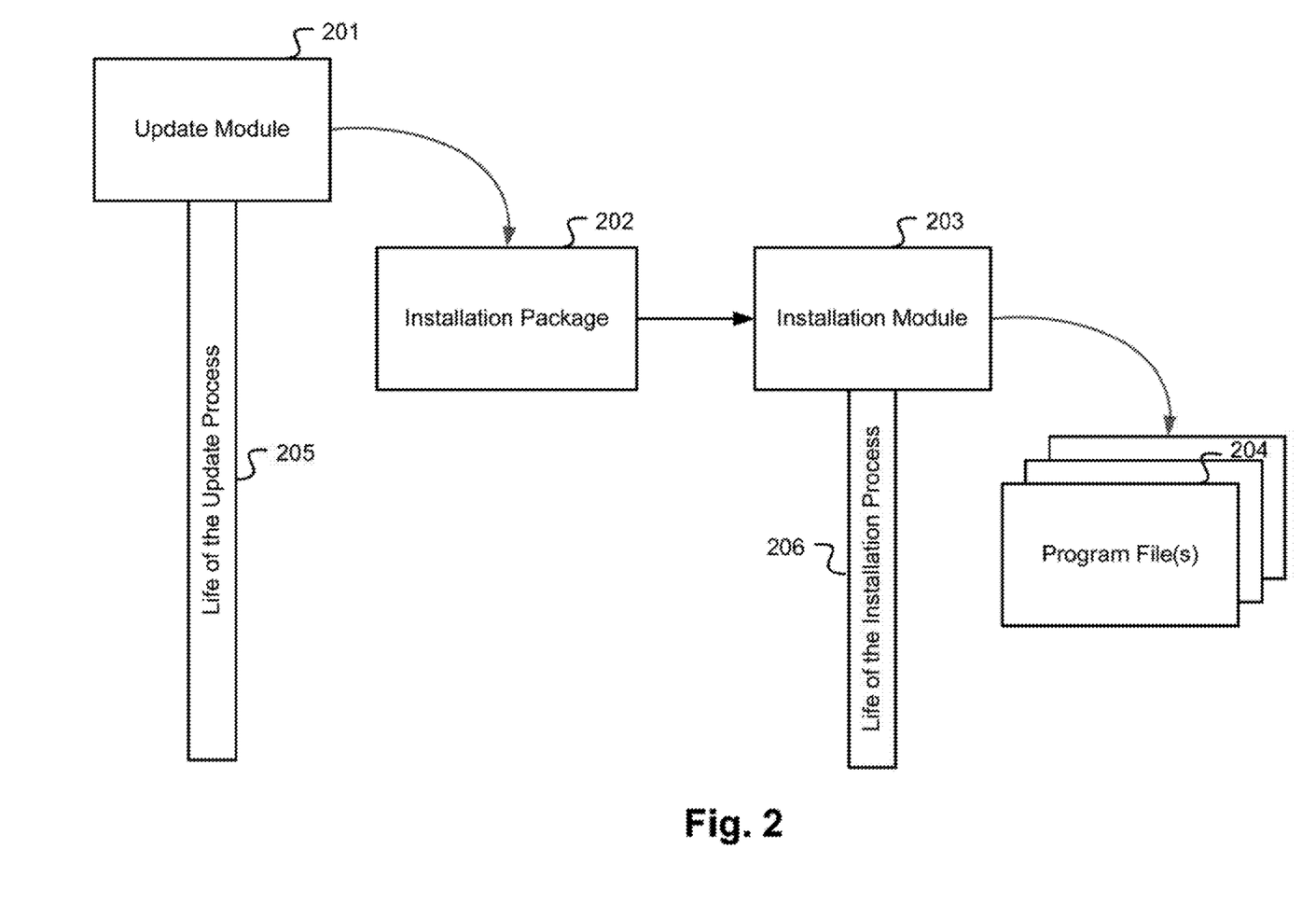
FIG. 2 illustrates an example implementation of program update process.

FIG. 2 shows an example of a program update process. Software programs installed on computers 103 in the network 101 must be updated every time a program update becomes available. Such updates are necessary for several reasons. For example, software can have bugs in its original code, which were missed during the initial testing of the software, so they may remain in the final version of the software sold to the users. These bugs can cause the software to work improperly, cause the software to consume excessive system resources (e.g., memory, processor time), or create security vulnerabilities, which can be exploited by malware. Therefore, software updates provide necessary fixes that correct various known defects, get rid of security vulnerabilities, and/or expand or improve the functionally of the software.

In one example implementation, the updates of programs installed on a computer 103 may be initiated and performed by an update module 201. In one implementation, module 201 may be a component (e.g., code, script, and subroutine) of the software program that is being updated. In another implementation, module 201 may be a dedicated program that performs update of one or more related programs (e.g., a software suite, such as Kaspersky One®). Yet in another implementation, module 201 may be a software component of the administrative agent deployed on the computer 103. In either case, update module 201 may be configured to obtain updates for one or more programs installed on the computer 103 from a remote update server, e.g., administrative server 102, which can be hosted by, for example, a company that made the program(s) being updated or a third-party update service provider.

In one implementation, update module 201 may periodically or at a predetermined date/time launch an update process 205 on the computer 103 that sends messages to the remote update server to check for new updates. If the server has a new program updates, then the update module 201 downloads the update(s) to the computer 103. In another implementation, when the update server has a new program update, the server may initiate transmission of the program update data or to the update module 201.

A program update may be provided as an installation package 202 having one of the following file types: *.bat, *.cmd, *.js, *.vbs, *.pif or as a binary file. A typical installation package 202 for a WINDOWS-based program may be of a *.msi or *.msp file type. The installation package 202 typically contains the code and data necessary for correct updating of the software program on computer 103. Such data may include updated program files, information about catalogue structure, OS registry information, and other types of data.

In one example embodiment, installation module 203 performs installation of the program update, i.e., installation package 202, by launching an installation process 206 on the computer 103. In one implementation, the functionality of the installation module 203 may be included in the update module 201. In WINDOWS OS, the installation module 203 may be program msiexec.exe. Module 203 updates the program by following the instructions that are contained in the installation package 202 and by using the data in this package 202. In one implementation, several installation modules 203 can be used during program update while the control of the installation process 206 is transferred consecutively from one installation module 203 to another. There are also implementations when the transfer of control between the participating modules 2003 can be done in less obvious ways using, for example, Inter-Process Communication (IPC) mechanism. It should be noted that, in on example implementation, any one of the installation modules 203 can load new installation packages 202 necessary for correct updating. Yet in another implementation, an installation module 203 can change the installation package 202 into a temporary file, and later initialize the installation of the package 202 from that temporary file using Component Object Model (COM)-server mechanism.

It should be further noted that during program update, i.e., installation of package 202, new programs files 204 may be created from the installation package 202 and/or old program files 204 or their metadata (e.g., name, size, location) can be modified. In such cases, during an update of an authorized program, i.e., a program that is allowed to be updated according to administrative policy, errors during the creation of new or modified program files 204 may occur because of insufficient information about these files or their metadata to properly categorize these files as authorized or not authorized. Also, the metadata may change during the program update and may no longer correspond to the category of authorized metadata. In these cases, the update of the program may be blocked as being unauthorized.

Figure 3:
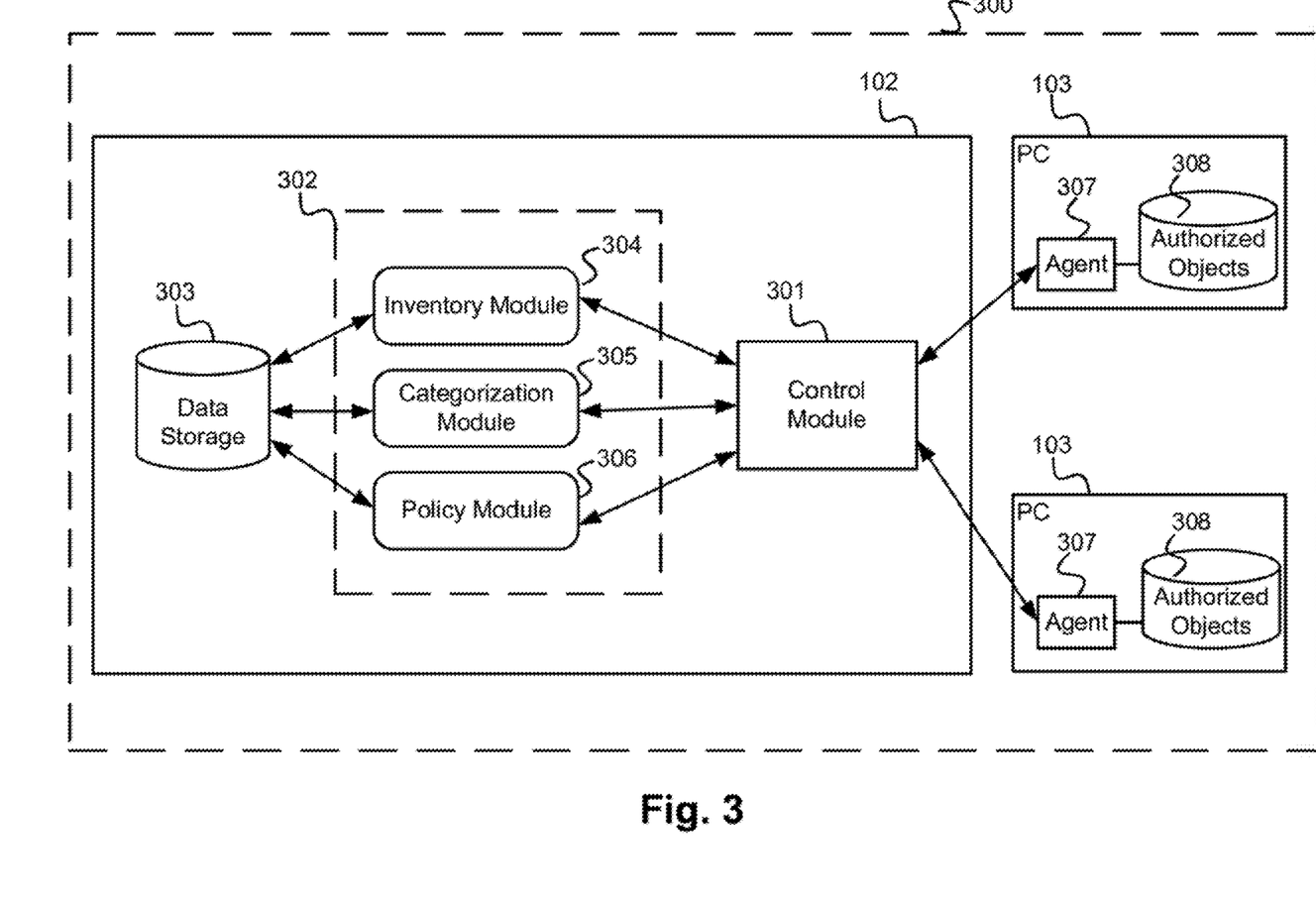
FIG. 3 illustrates an example embodiment of a client-server infrastructure for updating authorized programs on client computers.

FIG. 3 illustrates an example embodiment of a client-server infrastructure for updating authorized programs on corporate computers. The system 300 includes an administrative server 102 and multiple computers 103. The administrative server 102 includes a control module 301, a plurality of administrative modules 302 and data storage 303. The administrative modules 302 may include, but not limited to, inventorization module 304, categorization module 305, policy module 306, as well as a network topology building module (not shown), a module for searching and removing vulnerabilities (not shown) on computers 103, and other modules. The data storage 303 contains updates for different programs, the information on topology of the network 101, security patches, lists of known vulnerabilities, the software and hardware information for every computer 103 in the network 101, program categorization rules, the policies of program control, and other data. The data storage 303 may be constantly updated with the information provided by the antivirus company.

In one example embodiment, the administrative server 102 deploys administrative agents 307 on computers 103. The server 102 uses administrative agents 307 to remotely administer programs on computers 103. The administrative server 102 uses control module 301 to communicate with agents 307 on computers 103 and perform various remote administrative tasks, such as inventorization and categorization of applications and programs on computers 103, application of security policies and program updates. In one implementation, the administration server 102 may use Kaspersky Administration Kit, Kaspersky Endpoint Security, Kaspersky Security for MICROSOFT Exchange Server, and/or Kaspersky Anti-Virus for WINDOWS Workstations to perform various administrative tasks.

In order to perform administration of computers 103, the administrative server 102 uses control module 301 to connect to the administration agents 307 deployed on computers 103. The administrative server 102 then activates inventorization module 304 to formulate inventorization tasks for the administration agents 307 to be performed on computers 103. During inventorization, administrative agents 307 collect information about software applications installed on computers 103. The collected information may include, but not limited to, versions of applications, digital signatures used by the applications, unique programs identifiers (e.g., hashes or checksums), manufacturer information, paths where the applications are installed, etc. The collected information for each computer 103 is designated by a unique identifier, such as a MAC address, IP address, or serial number of the computer 103, or the like. The collected inventory data for each computer 103 is stored in data storage 303, and can be searched in the storage 303 using the unique identifier associated with the computer 103.

The inventorization process may be performed by the control module 301 periodically, which enables finding new applications and programs installed by the users on the computers 103. This way, the list of all known applications in the network 101 is always current. Also, in one implementation, when a user installs a new program on a computer 103, the administrative agent 307 may collect information about this program and send it to the administrative server 102 in order to update the software inventory data in the storage 303.

In one implementation, the administrative modules 302 uses categorization module 305 to categorize applications installed on computers 103 into different categories. In one implementation, the data storage 303 stores software categorization rules. These rules may be based on different metadata of applications, like the names of files or the unique identifiers, or the names of the manufacturers, and so on. For example, the rule for the name of the manufacturer of "Opera Software" may categorize this manufacturer as "Browsers". Also, there could be a rule that groups all the applications and files necessary for the operation of OS into the category "Files of the Operating System". Also, for example, there could be a rule that groups all applications that require updating into the category "Applications for Updating". Also, there may be a rule categorizing trusted, non-malicious applications, as applications that are authorized for installation and execution on computers 103. The categorization module 305 may place such authorized applications into the authorized category of "Authorized Applications".

In one implementation, the categorization module 305 categorizes all applications installed on the computers 103 by applying the categorization rules to the software inventory data stored in storage 303. Once a program is categorized into one or more categories, the categorization module 305 adds the categorization information for each program to the software inventory data for this program in data storage 303. In one example implementation, the categorization rules can be received from a remote database maintained by the company providing antivirus services, such as Kaspersky Lab. In this case, the categorization module 305 can connect to the remote database in order to categorize an application that has not been categorized by the rules from the storage 303, or in order to receive new categorization rules. The categorization module 305 may also filter programs installed on computers 103 by category to identify which computers 103 have programs that belong to particular categories. In another example implementation, a system administrator may create custom categories of programs authorized for use by different computer users, including, for example, in this category specific software packages, graphic design software, task planners, and browsers used by the user.

In one example embodiment, the administrative module 302 and the categorization module 305 have access to a remote database of clean objects. This database may be provided by the antivirus company (not shown on FIG. 3). The database of clean objects may contain information on authorized (or trusted) objects, such as various files, references and the like. Such database contains a very large volume of information on all applications that are "clean", i.e. they do not carry malicious functions and can be safely installed and executed on computers 103. The categorization module 305 can connect with the aforementioned database in order to determine which unauthorized (or untrusted) programs exist on computers 103. To that end, the categorization module 305 may compare the information it collected during software inventorization of computers 103 with the information from the database of clean objects. In one implementation, data storage 303 contains the rules for categorization of unknown (or untrusted) objects. Such a rule would allow to categorize the application, whose data was collected during the inventorization, and whose data is absent at the remote database of clean objects. The categorization module 305 determines the categorization of such application by applying the rules to the data collected during the process of inventorization.

In one example implementation, the system also supports a reverse operation. The administrator, knowing that an application that has been categorized as untrusted is not in fact malicious, may change the category of this application. At the same time, the categorization module 305 can send updated categorization information to the antivirus company. For example, the categorization module 305 can send to the antivirus company the metadata of the recategorized application, such as file names, unique identifiers, the name of the manufacturer and other information categorizing the application as clean. The antivirus company can check accuracy of the new categorization of the application and update the clean object database by including the subject application in the database of clean objects. Also, similar actions can be done automatically by the antivirus company. For instance, the information that this particular application is not malicious can be sent to the server of the antivirus company, which would update the clean object database after a certain number of users have sent similar information.

In another implementation, the administrator, knowing that a particular application was placed in a wrong category by the categorization module 305, can change the category of this application in the data storage 303. At the same time, the categorization module 305 can sent the information about recategorization of the application to the antivirus company. In another implementation, when the administrator cannot conclusively determines whether certain application should be categorized as an authorized (or trusted), it request the server of the antivirus company for perform remote categorization of the application. Such actions help the antivirus company create new rules of categorization and to correct the old ones. Afterwards, the new or corrected categorization rules are used to update data storage 303.

In one example embodiment, the administrative modules 302 may also include a policy module 306 that generates and applies policies of control over installation and execution of applications and programs on computers 103. In one implementation, a policy is a set of rules that specify which users can use which applications on computers 103. This set of rules includes, at the very least, the rules that help determine, based on program's metadata, to which category each application on computer 103 belongs, and the rules that help to determine which application can be executed by which users. Also, there are rule that specify various limits imposed on specific users, which prohibit certain functions of certain applications. As an example of a rule limiting program functionality is a rule that denies application access to certain network ports when the application is executed by certain users. Also, other rules may completely prohibit use of certain programs to certain users.

In one example implementation, a different policy may be generated for each user of computer 103. In other words, actions permitted to one user may be not permitted to another, whether on the same computer 103 or on a different one. The categories of the applications that are prohibited by the policy are not permitted to be used. This way, in order to prohibit use of all applications from the category "Games", it is enough not to create a policy with the help of the policy module 306 from the series of the administrative modules 302. Thus, if an application is not listed in the authorized category of applications in a policy of a certain user, the user is prohibited from using this application on the computer 103.

As explained above, the policy for each computer 103 contains a set of rules that are used to determine if an application installed/executed by a user on computer 103 belongs to the authorized category of applications, with which the user is allowed to work. In one implementation, this set of rules is used to generate/update databases of authorized objects 308 on computers 103. For example, the policy may contain a list of all authorized applications for a particular user of computer 103. This list may contain not only names of authorized applications, but also the other metadata of the authorized applications, such as, for instance, unique identifiers, such as hashes or checksums, digital signatures and the like. The policy module 306 is configured to transfer such policies to the computers 103 in the network 101 in order to allow computer user to work only with authorized applications and programs. In one implementation, the policy module 306 may generate a task of transferring policies to the certain computers 103 and sends it to the control module 301. The control module 301 establishes connections with administrative agents 307 on the specified computers 103 and sends appropriate control policies to each computer 103. The administrative agents 307 on computers 103 execute these policies on computers 103. At the same time, the sets of rules that specify authorized applications are stored in database of authorized objects 308.

In one example implementation, the administrative agents 307 are configured to constantly monitor the operation of computers to identify user's attempts to launch applications on the computers. If such an attempt is made, then agent 307 can determine, if this application is allowed to launch by this particular user on this particular computer 103 in accordance with the appropriate control policy. Agent 307 does that by comparing the metadata of the application with the rules stored in the database of authorized objects 308. If the comparison shows that the application corresponds to the authorized category of applications, then the application would be allowed to launch on the computer 103. Particularly, the administrative agent 307 may use a first set of rules to determine the category to which this application belongs. Next, the agent 307 may use the second set of rules to determine if the application from this category can be launched by this user on computer 103. Thus, when the policy includes a list of authorized applications within certain categories of applications for a particular user of computer 103, and the comparison of metadata of an application that the user attempts to launch on computer 103 with the list of authorized applications indicated that this application falls into the authorized category of the applications, the administrative agent 307 allows launch of the application on computer 103.

In one example embodiment, the policies may not be sent to each computer 103; instead, the policies for all computers 103 may be stored in a central database, such as data storage 303 of the administrative server 102. In this implementation, administrative agent 307 on computer 103 will determine what application is attempting to launch on computer 103, based for example on application's metadata, and send a query to the administrative server 102 to resolve whether this application is authorized to execute on computer 103. The server will check control policies stored in data storage 303 and respond indicating whether the application is allowed to execute or not allowed to execute by the user on computer 103.

In sum, in order to perform effective administration of applications on computers in the corporate network 101, it is necessary to perform inventorization of software on computers 103, categorize all applications and programs, and generate and apply control policies for each user of computers 103, so that only authorized applications can be launched on computers 103.

Figure 4:
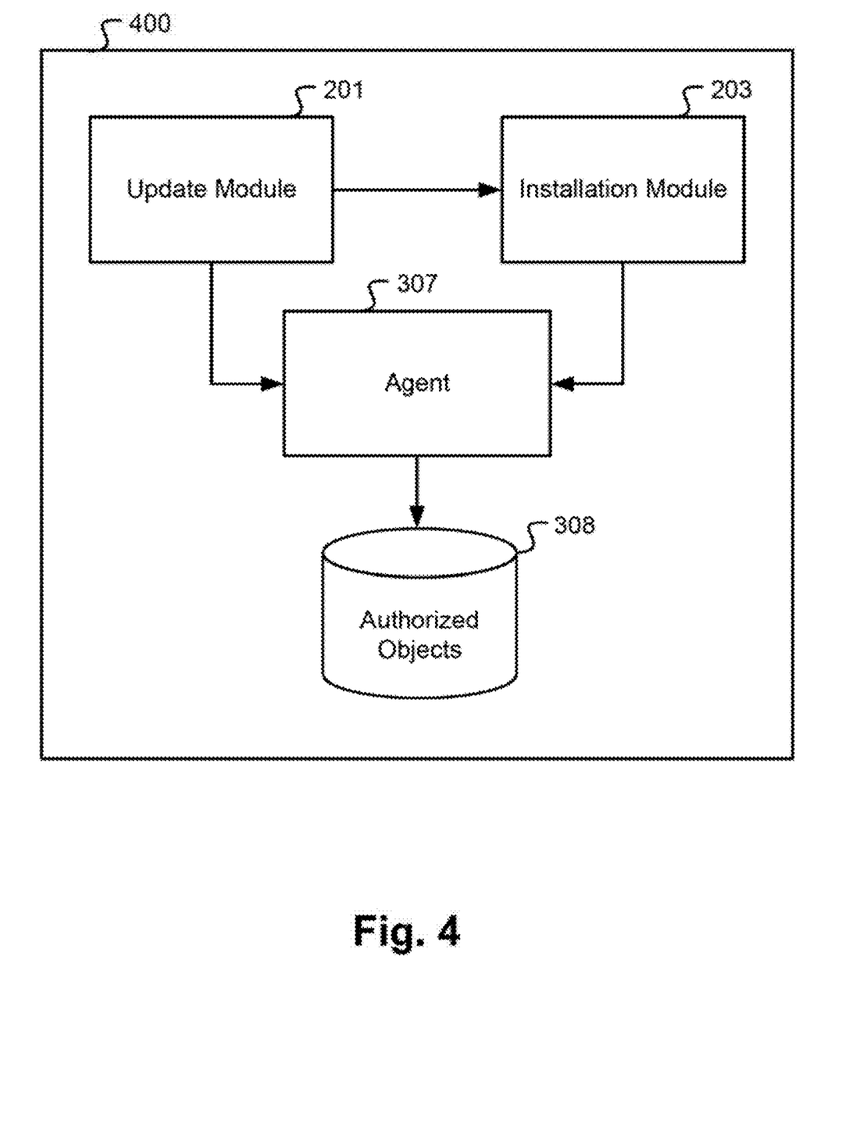
FIG. 4 illustrates an example embodiment a system for updating authorized programs.

FIG. 4 shows an example embodiment of a system for updating authorized programs on computers 103. The system 400 includes update module 201 (which can be an application that initiates program update), installation module 203 (which can be an application for installing program update), administrative agent 307 and database of authorized objects 308. During update process, the system uses installation packages 202 (not shown) and new and updated programs files 204 not shown). In order for this system 400 to work, categories of authorized applications should be defined in advance. Also, the policies should be generated for all users of computers 103 to identify which users are allowed to work with which programs on computers 103. Thus, in terms of categorization, all software installed on computers 103 that needs updating or performs updating services can be put into the authorized category of "Applications for Updating". A policy can be generated for this category for all users of computer 103, which would allow users to use authorized programs only. Moreover, it can be provided in the policy, that the new and updated program files 204 created by an authorized program or applications, can be automatically designated as "trusted" in order for this system to function efficiently. Thus, in one implementation, the system will create rules that designate new or updated program files 204, created during the process of updating by authorized programs, as trusted. For example, in one implementation, a new parameter of "trustworthiness" may be added as a metadata to the new or updated program files 204 if these files were created during operation of update process or operation of the program. These and other metadata parameters for the new or updated program files 204, such as identifiers of these files, may be stored in the database of authorized objects 308 for the continuation of updating process.

In another implementation, all software on computers 103 used for installing updates can be placed under separate authorized category of "Applications for Installations". A policy can be generated for this category for all computers 103. This policy would allow those applications to perform installation functions. Besides, in order for this system to function, the policy for this category can be generated in such a way that the installation module 203 would also become trusted, in order to give module 203 access to other trusted objects, which were generated during the work of an authorized application from the authorized category of "Applications for Updating". Thus, within this policy for the category "Applications for Installations", the rules may exist that would indicate the installation module 203 to be trusted in case it provides access to the trusted objects. With that, these rules may allow the creation of the new program files 204 for the installation module 203. Those files will also be designated as trusted during the life of the update process initiated by the module 201.

It should be note that the categories mentioned above may be stored in the database of the authorized objects 308 on computers 103. These categories may be generated automatically by the categorization module 305, or by the administrator. They may also be based on external expert knowledge, such as the information given by an antivirus company.

Figure 5:
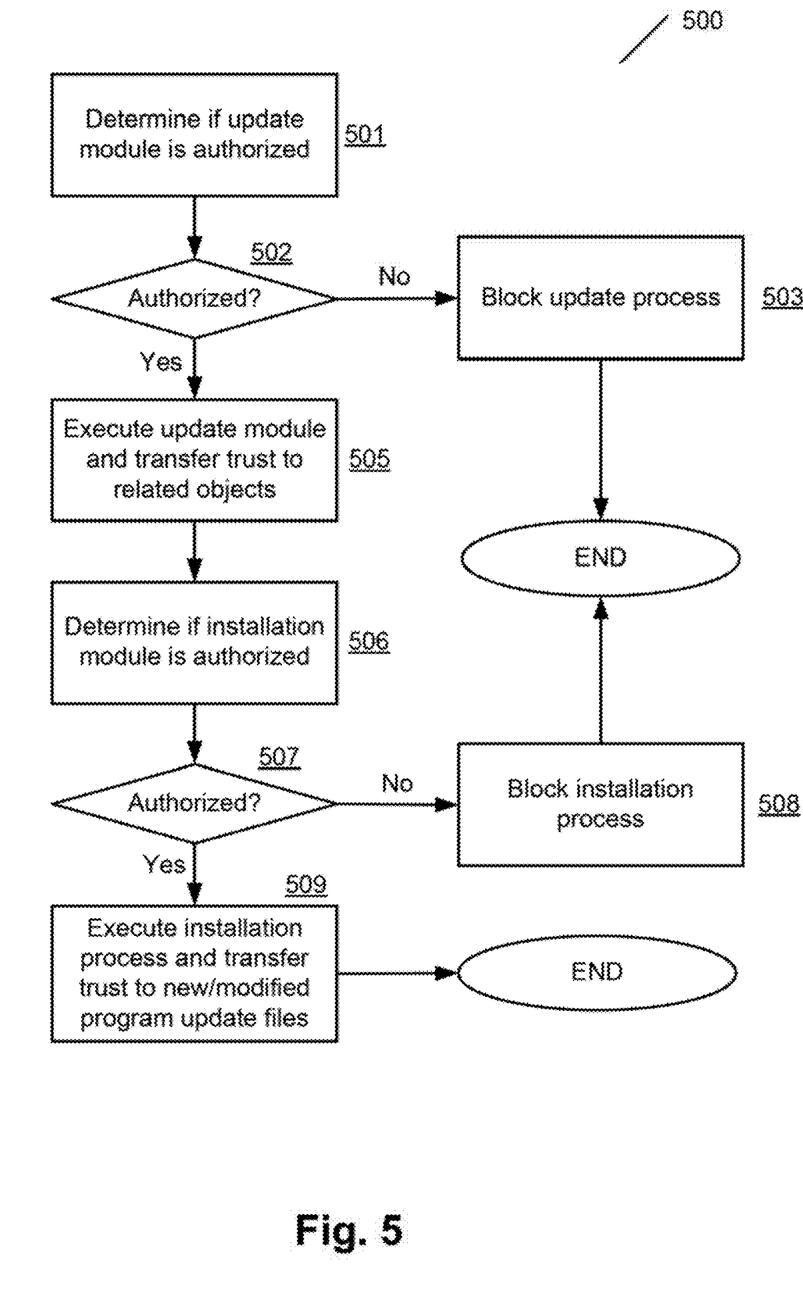
FIG. 5 illustrates an example implementation of a method for updating authorized programs on corporate computers.

FIG. 5 illustrates an example implementation of a method for updating authorized programs that can be performed by system 400 (FIG. 4). At step 501, the method determines if the updating module 201 on the computer 103 that initiates a program update is allowed to execute on computer 103. As explained above, the administrative agent 307 is configured to monitor the resources of the computer 103, on which it is installed, in order to determined when a user attempts to launch an a software program on the computer. Once the administrative agent 307 detects the attempt to launch an update module 201 on computer 103, the agent 307 also determines, if this update module 201 is authorized to execute on computer 103. To that end, the administrative agent 307 is configured to identify metadata of the update module 201. The administrative agent 307 may then compare at least one type of this metadata (e.g., name of the update module 201) with the information stored in the database of authorized objects 308, such as categories of authorized programs and associated policies. Based on results of comparison, the administrative agent 307 determines whether update module 201 belongs to the authorized category of programs. In one implementation, the administrative agent 307 may also use determines, if this updating module 201 from the authorized category of programs can be launched automatically or by the user of computer 103.

If the administrative agent 307 determines, at step 502, based on information about authorized objects, that update module 201 is not authorized to execute on the computer 103, then administrative agent 307 blocks execution of the update module 201, at step 503. The update module 201 may be blocked if there is a policy explicitly forbidding execution of this particular update module 201 on computer 103, or if there is no policy allowing execution of this update module 201. However, if the administrative agent 307 determines, at step 502, based on information about authorized objects, that update module 201 is authorized to execute on the computer 103, the agent 307 allows execution of the update module 201, at step 504. The update module 201 may be allowed to execute on computer 103 when the metadata of the module 201 is listed in the authorized category of "Applications for Updating" or associated policy stored in the database of authorized objects 308 on computer 103.

During execution of the update module 201, the module launches an update process 205, which downloads on the computer 103 an installation package 202 associated with the update module 201. Since update module 201 belongs to the authorized category of programs, a policy for the computer 103 may designate all processes launched by the update module 201 (e.g., update process 205) and all objects created/downloaded as a result of the execution of the update module (e.g., installation package 202), as trusted processes and objects. In one example implementation, the administrative agent 307 may update in the database of authorized objects 308, metadata of the update process 205 and metadata of the installation package 202 to include "trusted" attributes. Next, the update module 201 transfers the downloaded installation package 202 to the installation module 203.

At step 505, the administrative agent 307 determines if the installation module 203 is allowed to be executed on the computer 103. As explained above, the installation module 201 launches an installation process 206 that installs the installation package 202 on computer 103. For example, program msiexec.exe in Windows OS can be an installation module 203 for an installation packages 202 of an *.msi file type. In one implementation, the administrative agent 307 is configured determine the metadata of the installation module 203 and to compare at least one type of this metadata (e.g., name of the installation module 203) with the information from the database of the authorized objects 308, such as categories of authorized programs and associated policies. Based on results of the comparison, the administrative agent 307 determines whether installation module 203 belongs to the authorized category of programs, such as a category of "Applications for Installations". If, at step 507, the installation module 203 is determined to be authorized, the administration agent 307 will allow execution of the installation module 203 on computer 103, at step 508. However, if, at step 506, the installation module 203 is determined to be unauthorized, the administration agent 307 will block execution of the installation module 203 on computer 103, at step 507.

In addition, the administration agent 307 may determine whether the installation module 203 is allowed or not allowed to execute on the computer 103 based on the relationship between the update module 201 and installation module 203. For example, a policy in the database of authorized objects 308 may include a rule indicating that an object (or process) is allowed to execute only if that object (or process) is listed in the authorized category of programs (or has a "trusted" attribute), and that object (or process) was created by an authorized object, then this child object (or process) should be considered trusted. In this case, if the administrative agent 307 determines that installation module 203 (or installation process 206) is a child of the update module 201 (or update process 205) and the installation module 203 (or installation process 206) is listed with the authorized category of programs, then the administration agent 307 will allow execution of the installation module 203, at step 508. However, if the installation module 203 was not created by the authorized update module 201, or not listed with the authorized category of programs, then, the administration agent 307 may block execution of the installation module 203 on computer 103, at step 507.

During execution, at step 508, the installation module 203 launches an installation process 506, which installs on the computer 103 the installation package 202. Since the installation package 202 belongs to the category of trusted programs (e.g., has a "trusted" metadata attributed) and/or installation module 203 is considered to be authorized program, a policy for the computer 103 may designate all update program files 204 created from or modified by the trusted installation package 202, which is executed by the authorized installation module 203, as trusted processes and objects. In one implementation, the administrative agent 307 may update, in the database of authorized objects 308, metadata of the newly created or modified program update files 204 to include a "trusted" attribute. This transfer of trust allows smooth operation of the update system 400.

In one example implementation, upon finishing update of the authorized application on computer 103, the administrative agent 307 may connect to the administrative server 102 in order to forward to the server the metadata of the new or modified program files, so that information on this application is stored in the data storage 303 for future use. As explained above, in one example implementation, control module 301 of the administrative server 102 has access to a remote database of clean objects provided by the antivirus company. Thus, once the control module 102 receives an update for the data storage 303, such as the metadata of the new or modified program file, it may forward this information to the remote database of clean objects, if the latter lacks this information. In another implementation, the administrative agent 307 on computer 103 may directly connect to the remote database of clean objects and send information about the new or modified program file to the database.

Figure 6:
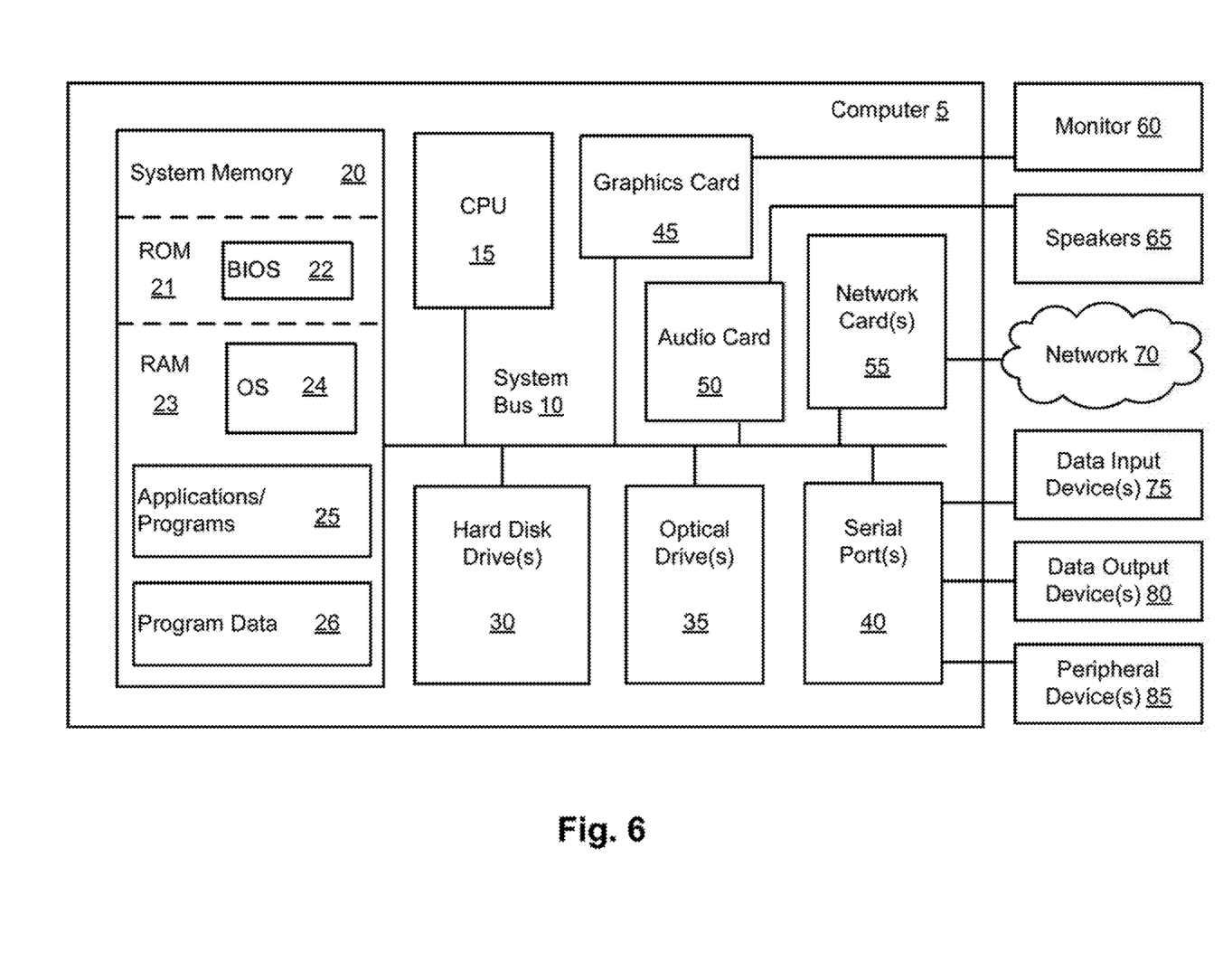
FIG. 6 illustrates an example embodiment of a general-purpose computer on which disclosed systems and methods for updating authorized programs may be implemented.

FIG. 6 depicts one example embodiment of a computer system 5, which could be used to implement the system and methods for updating authorized software described herein. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the systems and methods are disclosed herein. It will be appreciated that in the development of any actual implementations, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A method for updating software programs on a computer, the method comprising:
    detecting an attempt by an update process to execute on the computer, wherein during execution, the update process downloads an update object for a software program;
    retrieving a policy containing at least an authorized category of software programs for the computer, wherein the authorized category includes software programs that were checked for being clean of malware allowed to execute and update on the computer;
    determining from the policy whether the detected update process is associated with the authorized category of software programs;
    when the update process is associated with the authorized category of software programs, (i) designating the update process as trusted process, (ii) allowing the trusted update process to download on the computer an update object for a software program, (iii) and designating the update object of the software program as a trusted object;
    downloading by the trusted update process the trusted update object on the computer, wherein the trusted update object contains a software program update;
    detecting an attempt by an installation process to execute on the computer, wherein during execution, the installation process installs the trusted update object;
    determining from the policy whether the detected installation process is a child process of the trusted update process and associated with the authorized category of software programs; and
    when the installation process is the child process of the trusted update process and associated with the authorized category of software programs, designating the installation process as trusted and allowing the trusted installation process to install the trusted update object on the computer.

2. The method of claim 1, further comprising:
    when the update process is not associated with the authorized category of software programs, blocking the attempt by the update process to execute on the computer;
    when the installation process is not the child process of the trusted update process, determining from the policy whether the installation process is associated with an authorized category; and
    when the installation process is not associated with the authorized category, blocking the attempt by the installation process to install the update object on the computer.

3. The method of claim 1, further comprising:
    deploying an administrative agent of a remote administrative server on the computer;
    collecting by the administrative agent information about software programs installed on the computer; and
    sending the collected information to the remote administrative server.

4. The method of claim 3, further comprising:
    categorizing based on the collected information the software programs into categories; and
    generating a policy containing the authorized category of software programs, wherein software programs from the authorized category are allowed to execute and update on the computer.

5. The method of claim 4, wherein determining from the policy whether the update process is associated with the authorized category of software programs, further comprises:
    determining whether the update process is allowed to be launched by a given user of the computer.

6. A system for updating software programs on a computer, the system comprising:
    a hardware processor configured to:

detect an attempt by an update process to execute on the computer, wherein during execution, the update process downloads an update object for a software program;

retrieve a policy containing at least an authorized category of software programs for the computer, wherein the authorized category includes software programs that were checked for being clean of malware allowed to execute and update on the computer;

determine from the policy whether the detected update process is associated with the authorized category of software programs;

when the update process is associated with the authorized category of software programs, (i) designate the update process as trusted process, (ii) allow the trusted update process to download on the computer an update object for a software program, (iii) and designate the update object of the software program as a trusted object;

download by the trusted update process the trusted update object on the computer, wherein the trusted update object contains a software program update;

detect an attempt by an installation process to execute on the computer, wherein during execution, the installation process installs the trusted update object;

determine from the policy whether the detected installation process is a child process of the trusted update process and associated with the authorized category of software programs; and when the installation process is the child process of the trusted update process and associated with the authorized category of software programs, designate the installation process as trusted and allow the trusted installation process to install the trusted update object on the computer.

7. The system of claim 6, wherein the processor further configured to:

when the update process is not associated with the authorized category of software programs, block the attempt by the update process to execute on the computer;

when the installation process is not the child process of the trusted update process, determine from the policy whether the installation process is associated with an authorized category; and when the installation process is not associated with the authorized category, block the attempt by the installation process to install the update object on the computer.

8. The system of claim 6, wherein the processor further configured to:

deploy an administrative agent of a remote administrative server on the computer;

collect by the administrative agent information about software programs installed on the computer; and send the collected information to the remote administrative server.

9. The system of claim 8, wherein the processor further configured to:

categorize based on the collected information the software programs into categories; and generate a policy containing the authorized category of software programs, herein software programs from the authorized category are allowed to execute and update on the computer.

10. The system of claim 9, wherein to determine from the policy whether the update process is associated with the authorized category of authorized software programs, the processor further configured to:

determining whether the update process is allowed to be launched by a given user of the computer.

11. A computer program product embedded in a non-transitory computer-readable storage medium, the computer program product comprising computer-executable instructions for updating software programs on a computer, including instructions for:

detecting an attempt by an update process to execute on the computer, wherein during execution, the update process downloads an update object for a software program;

retrieving a policy containing at least an authorized category of software programs for the computer, wherein the authorized category includes software programs that were checked for being clean of malware allowed to execute and update on the computer;

determining from the policy whether the detected update process is associated with the authorized category of software programs;

when the update process is associated with the authorized category of software programs, (i) designating the update process as trusted process, (ii) allowing the trusted update process to download on the computer an update object for a software program, (iii) and designating the update object of the software program as a trusted object;

downloading by the trusted update process the trusted update object on the computer, wherein the trusted update object contains a software program update;

detecting an attempt by an installation process to execute on the computer, wherein during execution, the installation process installs the trusted update object;

determining from the policy whether the detected installation process is a child process of the trusted update process and associated with the authorized category of software programs; and when the installation process is the child process of the trusted update process and associated with the authorized category of software programs, designating the installation process as trusted and allowing the trusted installation process to install the trusted update object on the computer.

12. The product of claim 11, further comprising instructions for:

when the update process is not associated with the authorized category of software programs, blocking the attempt by the update process to execute on the computer;

when the installation process is not the child process of the trusted update process, determining from the policy whether the installation process is associated with an authorized category; and when the installation process is not associated with the authorized category, blocking the attempt by the installation process to install the update object on the computer.

13. The product of claim 11, further comprising instructions for:

deploying an administrative agent of a remote administrative server on the computer;

collecting by the administrative agent information about software programs installed on the computer; and sending the collected information to the remote administrative server.

14. The product of claim 13, further comprising instructions for:

categorizing based on the collected information the software programs into categories; and generating a policy containing the authorized category of software programs, wherein software programs from the authorized category are allowed to execute and update on the computer.

15. The product of claim 14, wherein instructions for determining from the policy whether the update process is associated with the category of authorized software programs, further comprise instructions for:
   determining whether the update process is allowed to be launched by a given user of the computer.

* * * * *